Sept. 21, 1965  T. R. RYAN  3,206,889
NOVELTY ANIMATED TOWEL HOLDER
Filed Oct. 22, 1963

INVENTOR.
THOMAS R. RYAN
BY Elliott & Pastoriza
ATTORNEYS

United States Patent Office 3,206,889
Patented Sept. 21, 1965

3,206,889
NOVELTY ANIMATED TOWEL HOLDER
Thomas R. Ryan, 535 Latimer Road, Santa Monica, Calif.
Filed Oct. 22, 1963, Ser. No. 317,938
1 Claim. (Cl. 46—116)

This invention relates generally to holding devices and more particularly to a decorative towel holder for use in housholds.

An ever present problem with conventional towel racks as used in bathrooms ad kitchens is the tendency for the towel to slip off the rack and fall on the floor. The situation is usually aggravated by children who often forget or simply refuse to hang up towels after use. As a conseqence, a considerable burden is placed on housewives in picking up towels from bathroom and kitchen floors.

With the foregoing in mind, it is a primary object of this invention to provide a simple, inexpensive, and decorative towel holder which avoids the possibility of towels being left on the floor after use.

Another object is to provide a holding device particularly suitable for towels and equivalent articles which is so designed as to be attractive to children to thereby encourage their use of the holder.

Briefly, these and many other objects and advantages of this invention are attained by providing a holding device in the form of an enclosure simulating an animal's head. This enclosure is adapted to be attached to a wall or other surface by simple screws. Incorporated within the enclosure is a suitable extendable and retractable means such as a roller and cord or line wound thereon. The free end of the line is adapted to extend from the mouth of the animal head shaped enclosure and terminate in a clip structure such as an alligator clip thereby simulating the teeth of the animal. A towel or other article may have a corner portion secured within the clip. Other simulated features of the animal's head such as the eyelids and/or ears are coupled to the extendable and retractable means within the head so that they will be caused to move when the line is withdrawn from the mouth of the animal.

With the foregoing arrangement, the towel is normally held in what appears to be the animal's teeth. When a child or other person wishes to use the towel, it is a simple matter for him to withdraw the towel pulling on the line and thereby moving the eyelids and/or ears of the animal in an attention attracting manner. Release of the towel after use will result in it automatically being retracted until the clip is again disposed within the animal's mouth so that the towel will depend in a proper position above the floor.

The extendable and retractable means may take the form of a simple spring bias roller about which the cord or line is wound.

A better understanding of the invention will be had by now referring to one embodiment thereof as illustrated in the accompanying drawings, in which.

Figure 1:
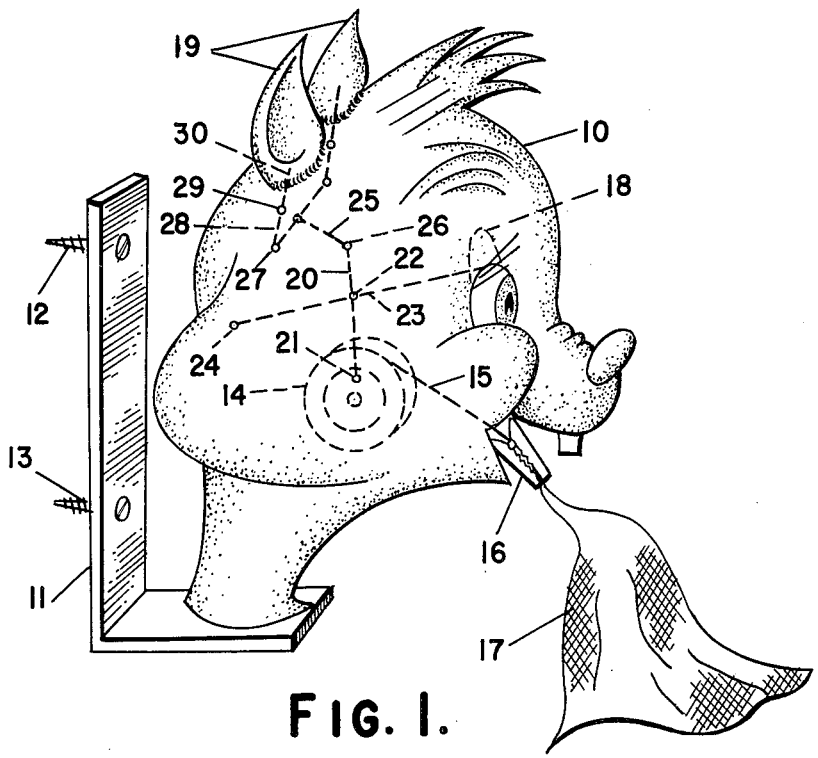
FIGURE 1 is a perspective view of the novelty holding device with certain of the components therein illustrated in dotted lines.

Referring to FIGURE 1, the holder comprises an enclosure 10 in a shape simulating that of an animal's head. The enclosure 10 may be mounted on a simple bracket structure 11 in turn adapted to be secured to a wall as by screws 12 and 13.

Figures 2, 3:
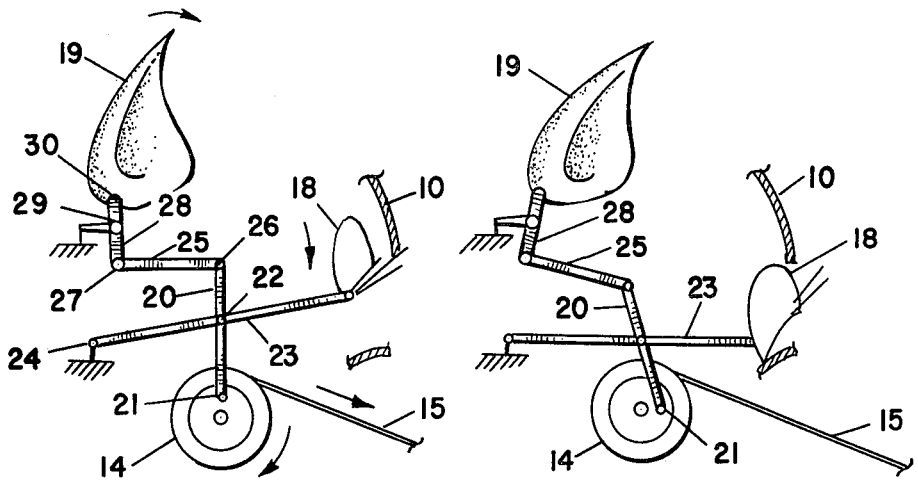
FIGURE 2 is a side elevational view partly schematic in form of only the components showing them in a first position.
FIGURE 3 is a view similar to FIGURE 2 illustrating the relative positions of the components during a subsequent stage in the operation of the device.

As indicated by the dotted lines and as shown in full lines in FIGURES 2 and 3, the enclosure 10 incorporates an extendable and retractable means in the form of a spring biased roller 14 for winding up a cord or line 15. The free end of the line 15 terminates in a clip structure 16 which may take the form of a conventional alligator clip so as to simulate the teeth of the animal. A towel or other equivalent article is shown at 17 with a portion thereof clipped within the teeth of the clip 16.

The spring biased roller 14 may be designed to exert a continuous retracting force on the line 15, the clip 16 being designed so as to seat in the mouth of the animal and prevent further retraction of the line 15 beyond a given point. As an alternative to a simple spring biased roller, a ratchet type roller may be used similar to a conventional window shade so that a small jerk on the end of the line will result in its retraction after the towel is used. Such devices are well known in the art and therefore a detailed description and showing thereof is not set forth.

As illustrated in dotted lines in FIGURE 1, the simulated head 10 includes movable features such as eyelids 18 and ears 19. These features are arranged to be coupled through a suitable link means to the roller 14 such that when the roller rotates, the eyelids will flutter open and closed and the ears will wiggle. This link mechanism can best be understood by specifically referring to FIGURES 2 and 3.

As shown, there is provided a first link 20 eccentrically mounted as at 21 to a side flange of the roller 14. An intermediate portion of this link is pivoted at 22 to a second link 23 at the cross-over point of the link 23 with the first link 20. The left end of link 23 is pivoted at 24 to a stationary structural portion within the head of the animal. The other end of the second link 23 may be rigidly secured to the eyelid structure 18. As a consequence, when the right hand far end of the second link 23 moves, the lid 18 will move along with it.

The upper end of the first link 20 is linked to the ears 19 through a mechanism including a link 25 pivoted to the upper end of the first link 20 as at 26 and pivoted at its other end at 27 to an ear rod 28. An intermediate portion of the ear rod 28 is pivoted at 29 to a stationary pivot structure. The upper end of the ear rod 28 in turn is rigidly secured to ears 19 as at 30.

In the operation of the interlinking mechanism, when the components are in the position illustrated in FIGURE 2, the eyelids 18 are up so that the animal's eyes are open as depicted in FIGURE 1. Further, the ears 19 are in a generally vertical direction. As the line 15 is withdrawn from the roller 14 to rotate the roller in a clockwise direction as viewed in FIGURE 2, after a quarter turn as illustrated in FIGURE 3, the link 20 will be moved downwardly thereby moving the right hand end of the link 23 downwardly to partially close the eyelid 18. Simultaneously, the link 25 will communicate the upper motion of the first link 20 to the ears 19 to cause them to tilt forwardly.

As the roller 14 continues to rotate, the eyelid 18 will be caused to be completely closed and the ear 19 will commence to wiggle in a reverse direction, the eccentric lower pivoting connection 21 resulting in cyclic operation of the link members.

In the operation of the overall holding device, the bracket 11 is secured to any suitable bathroom wall or other wall in a household as by the screws 12 and 13. A towel or other article may then be manually clipped in the alligator type clip 16 by simply withdrawing the line 15 partially and manually opening the spring biased clip to secure an edge or corner of the towel. Release of the line 15 will then result in the clip seating within the mouth so that the towel will depend from the animal's mouth as illustrated in FIGURE 1. In this position, the towel is free of the floor and will properly dry.

When a person is to use the towel, he simply grasps the towel 17 and pulls on the same to thereby withdraw the line 15 from the animal's mouth. This action results in rotation of the roller 14 thereby causing the eyelids to flutter and the ears to wiggle as described in connection with FIGURES 2 and 3. The motion of the animal's features in this manner is highly attractive particularly to children and encourages them to use the towel. When the child is finished and releases the towel, the line 15 will automatically be retracted within the head as a consequence of the spring biased roller 14. The motion is checked when the clip 16 seats within the mouth.

From the foregoing description, it will be evident that the invention has provided a novel holding device. While only one particular type of animal's head has been depicted, it will be evident to those skilled in the art that other shaped heads or caricatures may be used. Further, equivalent structure to the roller and link arrangement for causing movement of the features when the line is extended or retracted could, of course, be employed. The invention is, therefore, not to be thought of as limited to the one specific embodiment set forth merely for illustrative purposes.

What is claimed is:

A novelty towel holder comprising, in combination: an enclosing structure in a shape simulating an animal's head including eyelids, ears, and a mouth; a spring biased roller mounted within said structure; a line rolled on said roller with a free end extending from said roller out of said mouth, the said free end terminating in a clip structure simulating the teeth of said animal's head and adapted to be clipped to a towel; and interconnected link means including a first link having one end eccentrically pivoted to said roller and its other end linked to said ears; and a second link having one end linked to a stationary point in said enclosure and its other end coupled to said eyelids, said second link crossing over said first link and pivoted to said first link at said cross over point, said interconnected link means being responsive to rotation of said roller to move said eyelids and ears in a back and forth motion whereby pulling of said towel to extend said line from said mouth rotates said roller to move said eyelids and ears.

References Cited by the Examiner
UNITED STATES PATENTS

| | | | |
|---|---|---|---|
| 697,278 | 4/02 | Schluter | 211—89 |
| 839,337 | 12/06 | Thomander | 211—16 |
| 1,120,456 | 12/14 | Devall | 46—135 X |
| 2,071,225 | 2/37 | Buttigieg | 46—116 X |
| 2,710,489 | 6/55 | Myers | 46—116 X |

RICHARD C. PINKHAM, *Primary Examiner.*